Oct. 10, 1961   E. M. CALVELAGE   3,003,164
SAFETY BED OR BERTH FOR INFANTS
Filed May 21, 1958
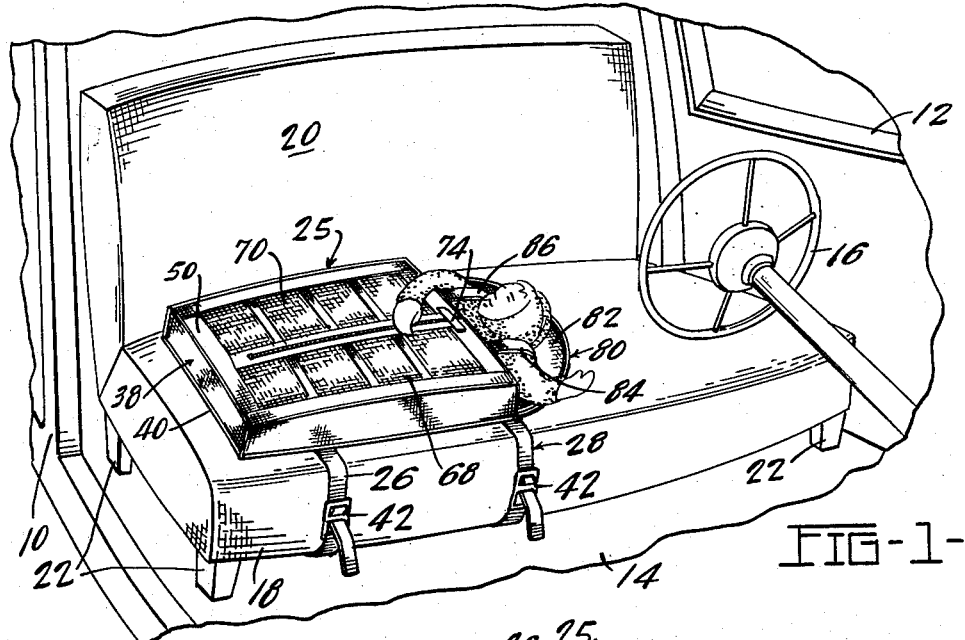
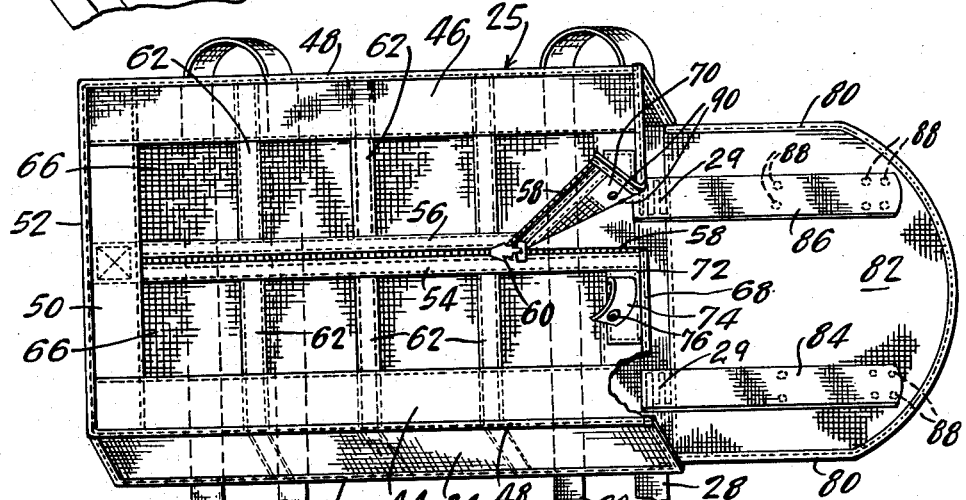
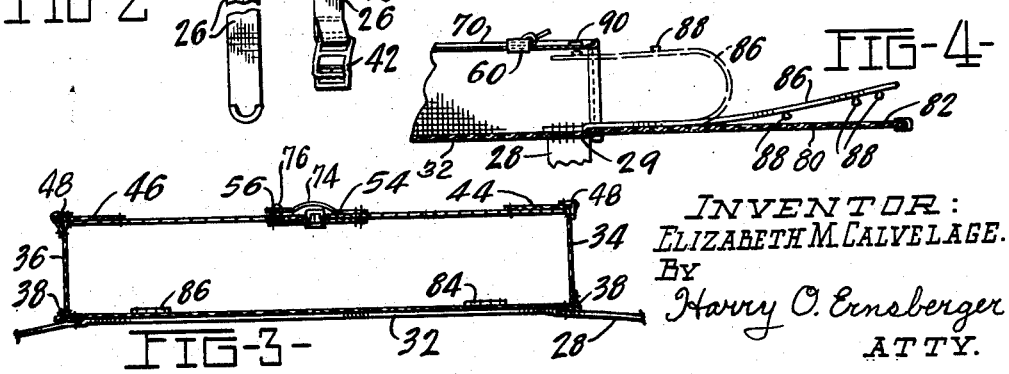
INVENTOR:
ELIZABETH M. CALVELAGE.
BY
Harry O. Ernsberger
ATTY.

Patent content

3,003,164
SAFETY BED OR BERTH FOR INFANTS
Elizabeth M. Calvelage, R.R. 3, Columbus Grove, Ohio
Filed May 21, 1958, Ser. No. 736,729
3 Claims. (Cl. 5—343)

This invention relates to a bed or berth for infants and more particularly to a bed or berth of a character which is completely collapsible and which is adapted to be removably secured to various types of seat or supporting surfaces.

The conventional infant's bed for use in vehicles comprises a rigid frame of wood or metal having side and end rails for supporting or suspending the bed component. Such constructions are not fully collapsible and are cumbersome to handle and use and seat area supporting the car bed cannot be utilized without complete removal of the bed from the seat. Furthermore, car beds having collapsible metal frames may be inadvertently or accidentally collapsed under the influence of inertia forces in the event of emergency stops or under the impact of collision.

The present invention embraces the provision of a safety car bed or berth for infants fashioned of flexible materials wtihout metal frame construction or reinforcing metal members whereby the bed is completely collapsible when not in use.

The invention has for an object the provision of a safety bed for infants especially adaptable for use wtih an automotive vehicle seat but which may be utilized in seats of trains, busses or may be used on table tops or other suitable supporting surfaces to retain an infant in a safe position.

Another object of the invention is the provision of a safety bed for infants which may be quickly and easily secured to a vehicle seat or other seat construction and readily and quickly removed therefrom when desired.

Another object of the invention resides in a car bed for infants fashioned entirely of flexible or textile-type materials which when not occupied by an infant completely collapses into a flat configuration and the seat on which the bed is secured may be used or occupied in the usual manner without the necessity of removing the bed from the seat.

Another object of the invention resides in a safety bed for infants fashioned with a relatively movable cover panel construction to facilitate placement of the infant in the bed and removal therefrom, the cover construction including a simple yet effective fastening means which assures retention of the infant even in the event of emergency stops or under impact of collision.

Another object of the invention is the provision of a safety car bed for infants fashioned of flexible material to provide a degree of freedom for the movement of the infant but which will securely retain the infant against dislodgement by inertia forces attendant the operation of a vehicle.

Another object of the invention is the provision of a car bed formed of flexible material having panel portions of open mesh netting for purposes of ventilation.

Still a further object of the invention is the provision of a safety car bed for infants fashioned of flexible textile-type material without any metal or frame components which is of extremely light weight and may be rolled or folded into a small, compact package for storage or for carrying the same and which may be washed in a washing machine or cleaned by conventional dry cleaning methods.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a perspective view of the operator's compartment of an automotive vehicle illustrating the safety bed in an operative attached position to the front seat;

FIGURE 2 is an isometric view of the infant's safety bed;

FIGURE 3 is a transverse sectional view of the bed, and

FIGURE 4 is a fragmentary longitudinal sectional view of a portion of the bed construction of the invention.

While the form of safety bed for infants is illustrated as particularly adaptable for retaining an infant on a front or rear seat of an automotive vehicle, it is to be understood that the bed consruction of the invention may be utilized in any environment for retaining an infant and may be secured to a bus seat, coach seat, davenport or other generally planar supporting surface.

With particular reference initially to FIGURE 1, there is illustrated a portion of an operator's compartment of an automotive vehicle wherein the body is indicated at 10 provided with a door construction 12, a floor 14, a steering wheel 16, and a front seat construction comprising a seat 18 and a seat back panel 20, the seat and seat back construction being carried by suitable supports 22 engaging the floor of the vehicle. A form of baby bed of the invention is illustrated at 25 and is particularly adapted to rest upon or be supported by the upper surface of the seat 18 and is secured by means of flexible straps 26 and 28 of conventional type. The arrangement in FIGURE 1 illustrates an infant retained in the bed construction.

The bed or berth construction is inclusive of a bottom or base panel 32, side panels 34 and 36, and a foot or end panel 38, the panels being made or fashioned of flexible material, and preferably of textile material such as denim, duck, canvas, or the like. The side panels 34 and 36 are stitched to the outer longitudinal edge regions of the bottom panel 32 and joined edges covered by suitable binding material 38 stitched to the adjacent panels to reinforce the edge regions and to present a neat appearance.

The foot panel 38 is stitched to one end of the bottom panel 32 and the juncture bound by binding material 40. Arranged transversely of the bottom panel 32 and extending coincident therewith are the securing straps 26 and 28, the adjacent areas of the straps and the bottom panel being stitched together as at 29 (shown in FIGURE 4) so that the straps are securely fashioned to the bottom of the bed structure. One end of each of the straps 26 and 28 is provided with a buckle or fastening means 42 of conventional character adapted to receive the free or distal end of the strap in a conventional manner.

As shown in FIGURE 1, the straps circumscribe or surround the seat 18 and cooperate with the buckles 42 for anchoring the bed to the seat or other supporting member or surface. Through this means the bed may be quickly fastened in position or removed from the seat or other support. While FIGURES 2, 3 and 4 illustrate the side and foot panels in vertical or upright position, it is to be understood that as these components are formed of flexible material, and the side panels 34 and 36 and the end panel 38 would normally collapse in accordion fashion and be disposed in contacting overlapping relation with the bottom panel 32 of the bed.

In the form of bed illustrated in the drawings, longitudinally extending strips 44 and 46 are provided forming components of cover panels or closure means for the rectangular structure provided by the bottom, side and foot panels.

The strips 44 and 46 are stitched along their outer edges to the side panels 34 and 36 respectively and the joining portions overlapped with binding material 48. A transversely extending strip 50 is disposed adjacent the foot panel 38 and is stitched thereto and to the ends of the longitudinally extending edge strips 44 and 46, the stitched juncture of the transverse strip 50 with the foot panel 38 being covered by binding material 52.

The cover or closure arrangement of the bed 25 is inclusive of coextending longitudinal strips 54 and 56 which are stitched at the foot end of the bed to the transversely extending strip 50. The meeting edge regions of the strips 54 and 56 are adapted to be joined together by readily separable fastening means which may be manipulated to provide access to the interior of the bed to facilitate placement of the infant therein and its removal therefrom.

In the embodiment illustrated, the adjacent edge regions of strips 54 and 56 are each provided with a row of fastener teeth 58 and a slide fastener or zipper control 60 cooperates with the rows 58 of fastener teeth to join the strips 54 and 56 through the zipper fastener construction. As shown in FIGURE 2, the strips 54 and 56 of the closure panels are joined with the edge strips 44 and 46 by means of transverse reinforcing bands or strips 62, the transverse strips 62 being stitched at their respective end regions to the center strips 54 and 56 and the edge strips 44 and 46. As shown in FIGURE 2, the strips 62 may be extended into coincidence with the side panels 34 and 36 and stitched into the seams thereof for added strength.

Extending throughout the areas between the edge strip 44 and the fastener strip 54 and between the edge strip 46 and the fastener strip 56 are one or more layers of open mesh netting 66 to provide ventilation for the interior of the bed. The netting material is preferably of a mesh of about six spaces per inch in each direction, but the mesh may be finer or coarser if desired. The mesh material is preferably of textile character and is stitched to the adjacent strips so as to provide closure or cover panels 68 and 70 arranged to be held in closed position by means of the slide fastener 60 joining the fastener teeth 58 in the conventional manner.

Stitched to the panel 68 onto a reinforcing strip 72 of the cover structure is a tab 74 provided with a male portion of a snap fastener 76 which is adapted for engagement with the female portion of a snap fastener secured to the cover panel 70. The tab 74 overlaps the slide fastener of the closure panels when the latter are in closed position as shown in FIGURE 1. The bottom or base panel is formed with an extension 80 preferably having a lining or layer 82 of cotton flannel or the like providing a soft material for contact with the head of the infant to facilitate comfort.

If desired, a soft filler may be interposed between the extension 80 and the covering layer 82 to form a cushion for the head of the infant. The infant's bed includes means which may be looped about the shoulders of the infant to prevent excessive lengthwise movement of the infant.

As shown in FIGURE 4, shoulder straps 84 and 86 are provided, the inner ends being stitched to the bottom panel by the stitching 29, the shoulder straps 84 and 86 being provided with male portions 88 of snap fasteners which are adapted for selective engagement with female portions 90 of snap fasteners affixed to the reverse sides of the cover panels 68 and 70.

The straps 84 and 86 are adapted to be looped about the shoulders of the infant in the manner shown in FIGURE 1, and in broken lines in FIGURE 4. By providing several male fasteners 88 spaced along the shoulder straps, the same may be thereby adjusted to accommodate infants of different length and for growth accretion.

The use of the safety bed is as follows: The bed is disposed upon a car seat 18 or other suitable support and the bed securing straps 26 and 28 passed around the car seat 18 and the straps drawn taut and buckled in the conventional manner as shown in FIGURE 1. In this position, the base or bottom panel 32 of the bed engages and is coincident with the supporting seat or surface. The slide fastener 60 is moved to the extreme left-hand position as viewed in FIGURE 2 releasing the fastening means of the cover panels 68 and 70 which may be parted to accommodate placement of an infant in the bed structure.

The slide fastener 60 is then moved to its extreme righthand position as viewed in FIGURE 2 rendering the fastening means effective to join the cover means or panels together. The tab 74 is then snapped into position as shown in FIGURE 1 to cover or shroud the slide fastener 60.

The shoulder straps 84 and 86 may be looped about the shoulders of the infant and the selected male fasteners 88 joined with the female fastener members 90 to prevent substantial endwise movement of the infant in the bed, the infant's head lying or resting upon the soft cotton flannel liner of the extension 80 of the bottom panel.

The infant may be quickly removed from the bed by disengaging the shoulder straps, releasing the tab 74 and manipulating the slide fastener 60 to release the cover panels 68 and 70. Through the bed arrangement of my invention, protection is afforded the infant against being thrown or dislodged from its position in the bed and the infant is prevented from substantial movement which would interfere with the operator of the vehicle and the infant is at all times under direct surveillance of the operator.

When the bed is not being used by an infant, it is unnecessary to remove the bed from the seat as the flexible material of the bed collapses into a flat position on the seat 18 and the seat may be used by additional passengers without inconvenience. The use of the open mesh fibrous netting 66 provides adequate ventilation for the interior of the bed structure and, furthermore, as the bed does not embody a metal frame or rigid components, the bed may be washed in conventional washing equipment or dry cleaned is desired.

The bed may be removed by manipulation of the buckles 42 and the entire bed folded or rolled into a compact, light weight package which may be easily carried or stored away. If further ventilation is desired the side panels 34 and 36 may be provided with inserts of open mesh netting or may be provided with perforations.

When the bed is not in use but is retained on a seat or support in collapsed position, the extension or head piece 80 and the shoulder straps 84 and 86 may be folded within the bed coextensive with the base 32 and the slide fastener or zipper moved to closed position. This insures cleanliness of the area contacted by the infant's head and face and such area does not come in contact with a person occupying the seat on which the bed is disposed.

While I have illustrated the preferred form of my invention as fashioned of flexible textile and netting materials, it is to be understood that some or all of the components of the bed structure except the slidable fastener means may be formed of resinous or plastic material such as polymers of vinyl acetate and vinyl chloride or other film-forming resins having high strength characteristics. Where the components are fashioned of resin film, they may be joined by heat sealing in the conventional manner.

It is to be understood that fastening means other than the slide fastener may be used, as for example, a row of spaced snap fasteners may be employed for the purpose.

The textile components of the bed structure may be formed of synthetic fibers or of glass fiber textiles. The securing straps 26 and 28 may be formed of heavy canvas, leather, reinforced resin plastics or other suitable material. Where a resin film is employed for the closure or cover panel structure, the film or sheet may be perforated to obtain ventilation.

One of the principal features of the invention is the provision of an infant's safety bed having no rigid frame construction whatever and which may be fashioned of materials of the character above-mentioned, all of which have desired flexibility so that the bed structure will collapse into a compact planar shape when not in use.

It is apparent that, within the scope of the invention, modifications and different arrangements may be made other than is herein disclosed, and the present disclosure is illustrative merely, the invention comprehending all variations thereof.

I claim:

1. An infant's bed for use with a seat of an automotive vehicle comprising a bottom panel, side panels and a foot panel fashioned of flexible material and forming a rectangular-shaped structure, cover means including at least one panel of flexible material having one edge region fixedly joined with the rectangular-shaped structure, disconnectable fastening means adapted to removably secure another edge region of the cover panel in closed position, said side panels and cover means defining an open end to accommodate an infant, an extension formed on the bottom panel for contact with the head of the infant, strap means secured to the rectangular-shaped structure for removably securing the structure to the vehicle seat, and a pair of shoulder straps fixedly secured to the bottom panel and adapted to be removably fastened to the cover panel for limiting endwise movement of the infant, said cover panel being provided with a reticulated section for ventilation purposes, and reinforcing members extending transversely across the reticulated section.

2. An infant's bed for use with a seat of an automotive vehicle comprising a base panel, side panels and a foot panel stitched together to form a generally rectangular-shaped structure, said panels being formed of flexible textile material, a cover for said rectangular-shaped structure including a pair of longitudinally disposed closure panels having their outer edge regions joined to the side panels, releasable slide fastening means arranged and foot panels, releasable slide fastening means arranged lengthwise of said closure panels to secure adjacent edge regions of the cover panels together to retain an infant within the rectangular-shaped structure, strap means stitched to the base panel adapted to secure the bed to the vehicle seat, a pair of shoulder straps secured to the base panel, said cover panels and said shoulder straps being provided with disconnectable fastening means, said base panel extending beyond the side panels at the open end forming a head engaging portion, said extending portion being lined with a soft textile material, and a reticulated section of open mesh netting provided in each of the closure panels, said side and foot panels being collapsible to a flattened position on the vehicle seat when the bed is unoccupied.

3. An infant's bed for use with a seat of an automotive vehicle comprising a base panel, side panels, and a foot panel joined to adjacent ends of the base and side panels to provide a rectangular structure, said panels being formed of flexible textile material, a cover structure for said bed including a pair of longitudinally extending cover panels, strips of textile material joining the outer longitudinal edge regions of the cover panels with the side panels, releasable slide fastening means arranged to secure adjacent meeting edge portions of the cover panels together to retain an infant within the rectangular structure, a pair of flexible straps joined to the base panel adapted to secure the rectangular bed structure to the vehicle seat, said base panel being formed with an extension adapted to be engaged by the head of the infant, a lining of soft material on said extension, a pair of shoulder straps stitched to the base panel, said shoulder straps arranged to embrace the shoulders of an infant, said shoulder straps and said cover panels being provided with disengageable snap fastener means for securing the shoulder straps in infant engaging position, a section of open mesh textile material provided in each of the cover panels, said side and foot panels being collapsible to a flattened condition on the vehicle seat when the bed is unoccupied.

References Cited in the file of this patent

UNITED STATES PATENTS

| | | |
|---|---|---|
| 1,653,815 | Millar | Dec. 27, 1927 |
| 1,732,878 | Collender | Oct. 22, 1929 |
| 1,770,841 | Clyman | July 15, 1930 |
| 2,368,220 | Hinds | Jan. 30, 1945 |
| 2,401,026 | Steigerwald | May 28, 1946 |
| 2,439,658 | Holloway | Apr. 13, 1948 |
| 2,481,741 | Graves | Sept. 13, 1949 |
| 2,611,131 | Heeter | Sept. 23, 1952 |
| 2,706,819 | McClure | Apr. 26, 1955 |